United States Patent [19]

Yoshida et al.

[11] 4,174,373

[45] Nov. 13, 1979

[54] PROCESS FOR REMOVING SULFUR OXIDES AND NITROGEN OXIDES FROM FLUE GASES

[75] Inventors: Kazuetsu Yoshida, Hachioji; Michiharu Seki, Fuchu; Keiichi Kanehori, Tokyo; Katsuhiro Kaneko, Sayama; Yo Sakurai, Kunitachi, all of Japan

[73] Assignee: Hitachi, Ltd., Japan

[21] Appl. No.: 609,081

[22] Filed: Aug. 29, 1975

[30] Foreign Application Priority Data

Sep. 4, 1974 [JP]  Japan .............................. 49/100904

[51] Int. Cl.² ............................................. B01D 53/34
[52] U.S. Cl. ....................................... 423/239; 252/44
[58] Field of Search ............................. 423/239, 213.2; 252/445

[56] References Cited

U.S. PATENT DOCUMENTS

| | | | |
|---|---|---|---|
| 3,279,884 | 10/1966 | Nonnenmacher et al. | 423/239 |
| 3,795,730 | 3/1974 | Kalvinskas | 423/239 |
| 3,864,451 | 2/1975 | Lee et al. | 423/239 |
| 3,887,683 | 6/1975 | Abe | 423/239 X |
| 3,961,020 | 6/1976 | Seki | 423/239 |

OTHER PUBLICATIONS

Markvart et al., "Journal of Catalysis", vol. 7, No. 3, Mar. 1967.

*Primary Examiner*—G. O. Peters
*Attorney, Agent, or Firm*—Craig and Antonelli

[57] ABSTRACT

A catalyst comprising carbonaceous materials such as activated carbon, etc. impregnated with bromine, iodine, chlorine or their compounds, is impregnated with a promoter containing a specific metal, and brought in contact with a flue gas in the presence of ammonia, whereby nitrogen oxides and sulfur oxides contained in the flue gas are removed with a very high percent removal. The removal can be carried out at a temperature much lower than that of the conventional process.

26 Claims, 3 Drawing Figures

PROCESS FOR REMOVING SULFUR OXIDES AND NITROGEN OXIDES FROM FLUE GASES

BACKGROUND OF THE INVENTION

1. Field of the Invention

This invention relates to a process for removing nitrogen oxides and sulfur oxides from a flue gas containing the nitrogen oxides and sulfur oxides.

2. Description of the Prior Art

Combustion apparatuses such as power plant boilers, etc. and internal combustion engines such as automobile engines, etc. have a high combustion temperature, and therefore nitrogen contained in fuel and in combustion air reacts with oxygen to form nitrogen oxides, mostly nitrogen monoxide. The formed nitrogen oxides are exhausted into the atmosphere together with flue gas. Nitrogen monoxide and nitrogen dioxide are also frequently discharged into the atmosphere from plants where nitric acid is handled.

From combustion apparatus such as the power plant boilers, etc. sulfur contained in the fuel is combusted and exhausted as sulfur oxides together with fuel gas.

These nitrogen oxides and sulfur oxides, once discharged into the atmosphere, give very harmful influences upon human bodies as well as animals and vegetables, and many processes have been so far proposed for removing these nitrogen oxides and sulfur oxides from the flue gas.

For example, absorption by an alkaline solution, washing by a slurry containing magnesium hydroxide, etc. have been proposed to remove nitrogen oxides from a flue gas from power plant boiler, etc., but these prior art processes have many problems such as failure to attain a sufficient percent removal, troublesome post-treatment of the absorbing or washing solution, or complicatedness of the process.

Furthermore, another process for removing nitrogen oxides from the flue gas has been proposed, which comprises contacting the flue gas with single activated carbon or activated carbon impregnated with vanadium oxide in the presence of ammonia, thereby removing the nitrogen oxides from the flue gas, but the prior art process has a low percent removal of nitrogen oxides, and consequently it is difficult to put the process in practice.

In addition, the so-called ammonia reduction process is now put in practice in various places, which comprises contacting the flue gas with ammonia in the presence of a catalyst such as vanadium pentoxide, iron oxide, or copper oxide at temperatures in excess of 300° C., thereby reducing nitrogen oxides to nitrogen. The prior art ammonia reduction process has such characteristics that the reaction product is harmless nitrogen, and washing, discharge of waste water, etc. are not required at all, and consequently the relevant treating steps can be saved. However, if dusts are contained in the flue gas, the dusts are liable to accumulate on the catalyst, and a continuous operation is impossible to conduct. Thus, it is necessary in the prior art ammonium reduction processes to remove the dusts from the flue gas in advance.

To remove dusts, it is necessary to pass the flue gas through an electrostatic dust collector, but a hot flue gas (e.g., over 300° C.) cannot be treated in the electrostatic dust collector. Thus, after the flue gas has been cooled (e.g., to about 150° C.), it must be passed through the electrostatic dust collector. However, if the flue gas temperature is low, percent reduction of nitrogen oxides is considerably lowered. This is a great disadvantage of said prior art process. To overcome the disadvantages, it is necessary to pass the flue gas through an electrostatic dust collector and heat the flue gas of low temperature to 350°–450° C. before the removal of nitrogen oxides, which increases the necessary facility cost and running cost.

Especially where both nitrogen oxides and sulfur oxides are discharged together, for example, from power plant boilers, etc., no practical process is yet available for removing these oxides at the same time with less expenses but high efficiency, and a development for such a process has been keenly desired.

SUMMARY OF THE INVENTION

An object of the present invention is to provide a process for removing nitrogen oxides and sulfur oxides from a flue gas simply but surely, while eliminating the aforementioned various disadvantages encountered in the prior art processes.

The object of the present invention can be attained by contacting a flue gas with a catalyst comprising a carbonaceous material such as activated carbon, etc., impregnated with at least one of chlorine, bromine, iodine, ammonium chloride, ammonium bromide, ammonium iodide, hydrogen chloride, hydrogen bromide and hydrogen iodide, and a promoter of a specific metal element in the presence of ammonia even at temperatures considerably lower than those employed in prior art processes.

One of the present inventors previously proposed a very characteristic process for removing nitrogen oxides and sulfur oxides simultaneously from a flue gas (U.S. patent application Ser. No. 403,832).

The present invention relates to an improvement of said prior art process, and first of all, brief explanation will be made of said prior art process below:

Carbonaceous material such as activated carbon, etc. is impregnated with a simple substance of chlorine, bromine, or iodine, or a compound capable of readily liberating these halogen elements, and is brought in contact with a flue gas containing nitrogen oxides and sulfur oxides in the presence of ammonia, whereby the nitrogen oxides and sulfur oxides contained in the flue gas can be removed from the flue gas according to the following respective reactions. Said prior art process will be hereinafter referred to as "conventional ammonium halide process".

First of all, explanation will be made of sulfur oxides. Sulfur oxides in the flue gas are converted to ammonium sulfate according to the following reaction formula, and ammonium sulfate is accumulated on the carbonaceous material.

$$SO_2 + 2NH_3 + H_2O + \tfrac{1}{2}O_2 \rightarrow (NH_4)_2SO_4 \tag{1}$$

In that case, chlorine, bromine or iodine supported on the surface of the carbonaceous material accelerates said reaction, and improves the percent removal of sulfur oxides. The carbonaceous material also has an effect upon acceleration of said reaction, though its detailed function is not clarified, and among the carbonaceous materials, activated carbon has an especially remarkable effect.

Now, explanation will be made of nitrogen oxides. It is presumed that nitrogen oxides in the flue gas are converted to ammonium nitrate according to the following reaction formula at the initial stage of contacting of the flue gas in the aforementioned manner, and the ammonium nitrate accumulates on the surface of the carbonaceous material:

$$NO + NH_3 + \tfrac{1}{2}H_2O + \tfrac{3}{4}O_2 \rightarrow NH_4NO_3 \quad (2)$$

However, as the reaction proceeds, nitrogen oxides are reduced to nitrogen according to the following reaction formulae:

$$NO + NH_3 + \tfrac{1}{4}O_2 \rightarrow N_2 \tfrac{3}{2}H_2O \quad (3), \text{ or}$$

$$6NO + 4NH_3 \rightarrow 5N_2 + 6H_2O \quad (4)$$

The chlorine, bromine or iodine present on the surface of carbonaceous material, for example, in the case of ammonium bromide, undergoes reaction according to the following reaction formulae at that time:

$$NO + NH_4Br \rightarrow NOBr + NH_4 \quad (5)$$

$$NOBr + NH_4 + \tfrac{1}{4}O_2 \rightarrow N_2 + \tfrac{3}{2}H_2O + HBr \quad (6)$$

$$HBr + NH_3 \rightarrow NH_4Br \quad (7)$$

When said reaction formulae (5), (6) and (7) are summed up, the same reaction formula as (3) can be obtained. That is, it seems that the reaction represented by the formula (3) occurs through the routes represented by the formulae (5), (6) and (7). Bromine of ammonium bromide can repeatedly contribute to the reaction without being discharged together with the treated flue gas.

Similarly, it seems that the reaction represented by the formula (4) passes through routes shown by the following formulae (8), (9) and (10):

$$6NO + 6NH_4Br \rightarrow 6NOBr + 6NH_4 \quad (8)$$

$$6NOBr + 4NH_3 \rightarrow 5N_2 + 6H_2O + 3Br_2 \quad (9)$$

$$3Br_2 + 6NH_4 \rightarrow 6NH_4Br \quad (10)$$

The nitrogen oxides and sulfur oxides contained in the flue gas are removed from the flue gas as nitrogen and ammonium sulfate, respectively, as described above, and the flue gas free from these oxides can be obtained. However, comparison of a rate of the reaction of removing the sulfur oxides shown by the formula (1) with rates of the reactions of reducing the nitrogen oxides shown by the formulae (3) and (4) reveals that the rates of the reactions of formulae (3) and (4) are very low.

This means that, when a flue gas is led, together with ammonia, to the bottom of a reactor column filled with the carbonaceous material impregnated with said halogen and passed therethrough in an actual system for treating the flue gas, the sulfur oxides are rapidly removed at the lower part of the reactor column, but complete removal of the nitrogen oxides requires a very large reactor column.

DETAILED DESCRIPTION OF THE INVENTION

The present invention relates to an improvement of said conventional ammonium halide process, and ensures acceleration of rates of the reactions shown by said formulae (5), (6) and (7) as well as (8), (9) and (10), and therefore ensures very rapid removal of the nitrogen oxides by use of a carbonaceous material impregnated with a specific metal element as a promoter and said halogen or a compound capable of readily liberating the halogen.

Figure 1:
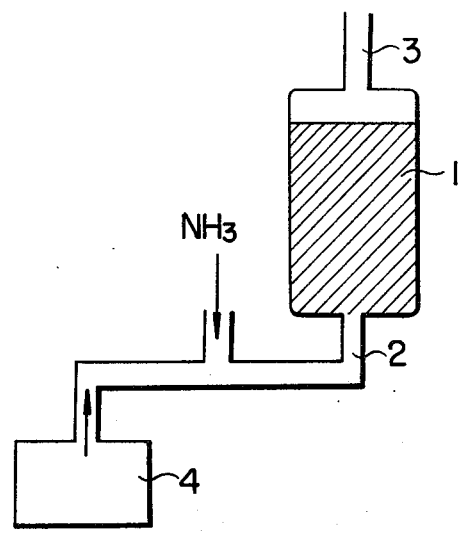
FIG. 1 and FIG. 2 are schematic diagrams explaining the principle of the present invention.

In FIG. 1, numeral 1 is a packed layer of the carbonaceous material. Usually activated carbon is used as carbonaceous material, and is impregnated with at least one of bromine, iodine, chlorine, ammonium bromide, ammonium iodide, ammonium chloride, hydrogen bromide, hydrogen iodide and hydrogen chloride. Said activated carbon impregnated with bromine, or the like functions as a catalyst for removing sulfur oxides and nitrogen oxides. The resulting activated carbon is impregnated with at least one of promoters shown below.

Flue gas generated in combustion equipment 4 is introduced into activated carbon-packed layer 1 through conduit 2 together with ammonia. The amount of ammonia to be added is almost equivalent to or a little larger than the stoichiometric amount of sulfur oxides and nitrogen oxides contained in the flue gas as shown in formulae (I) and (III).

When halogen or hydrogen halide is supported on the activated carbon, it reacts rapidly with the added ammonia to form ammonium halide. Ammonium halide supported on activated carbon removes the nitrogen oxides and sulfur oxides according to the aforementioned formulae (1) to (10). The treated flue gas is discharged to the outside through vent 3.

The promoter supported on the activated carbon together with ammonium halide promotes said reactions, and ensures prompt progress of the reactions even at the room temperature.

Figure 2:
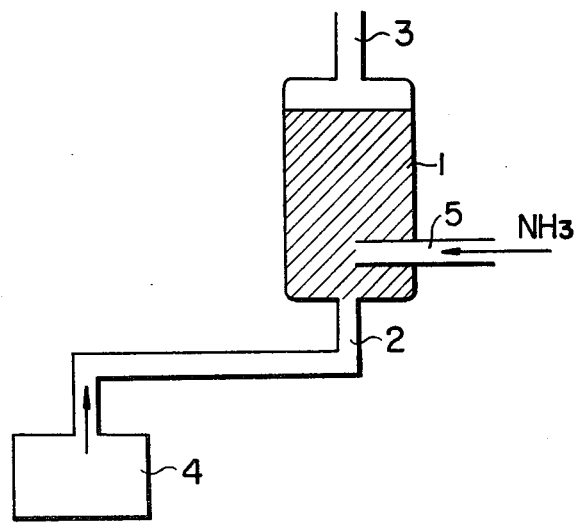

The ammonia is introduced to the activated carbon-packed layer together with the flue gas, as shown in FIG. 2, but can be directly introduced into activated carbon-packed layer 1 by means of inlet 5, as shown in FIG. 2.

The promoter to be supported on the carbonaceous material together with said halogen includes, for example, oxides and various salts of metal elements of group IB of the periodic table, such as copper, etc., elements of Group 3B such as lanthanum, etc., elements of Group 4B such as zirconium, etc., elements of Group 5B such as vanadium, etc., elements of Group 6B such as chromium, molybdenum, etc., elements of Group 8 such as iron, cobalt, nickel, etc., elements of Group 2A such as magnesium, etc., and elements of Group 3A such as aluminum, etc. Especially, oxides and salts of vanadium and copper are remarkably effective as the promoter.

The carbonaceous material to be impregnated with the promoter includes various materials such as activated carbon, amorphous carbon, graphite, charcoal, carbonized char, etc., and these materials can be used singly or in combination. However, activated carbon is especially distinguished among these materials, as in the conventional ammonium halide process. It is known that the activated carbon has a very large surface area, but it is presumed that the distinguished effect of activated carbon, which appears when it is applied to the ammonium halide process, is not only due to the large surface area, but also due to the fact that the activated carbon has some action as a catalyst to accelerate the oxidation or reduction reaction of the sulfur oxides and nitrogen oxides.

The most important feature of the present invention is in the use of said promoter of a specific metal element supported, together with at least one of chlorine, bromine and iodine, on the carbonaceous material in said ammonium halide process. That is, coexistence of ammonia and a catalyst comprising carbon-carbonaceous material, at least one of chlorine, bromine and iodine, and said promoter is essential and indispensable to the present invention, and the present invention is not established, if any one of these essential constituents is absent.

For example, a process for treating a flue gas has been proposed, which comprises contacting the flue gas with single activated carbon or activated carbon impregnated with vanadium oxide as a catalyst in the presence of ammonia. Since there is, however, no chlorine, bromine or iodine, as used in the present invention, in said process, the reactions shown by said formulae (5), (6) and (7) as well as (8), (9) and (10) fail to take place. That is, the mechanism of removing nitrogen oxides in said process is quite different from that of the present invention, and the rate of removing the nitrogen oxides is much lower than that of the present invention. To improve the percent removal, it is necessary in said process to carry out the contacting at temperatures much greater than 200° C. and usually as high as 350° to 450° C.

Even if other material than activated carbon, for example, alumina, etc. as a carrier is impregnated with vanadium pentoxide as a catalyst, the resulting material cannot reduce the nitrogen oxides to nitrogen, unless the material is similarly kept at a high temperature.

The carbonaceous material can be impregnated with said promoter practically in various manners. For example, the carbonaceous material is dipped in an aqueous solution of inorganic salt of said metal element such as nitrate or sulfate, or organic salt thereof as oxalates, etc., and dried e.g. at about 130° C. in air, or, after drying, heated at about 400° C. in an inert gas to decompose said salts. Or, the carbonaceous material is dipped in a solution obtained by dissolving a simple substance or oxide of said metal element in an acid, and thereafter treated in the same manner as above. A good result can be also obtained in the latter case.

In dipping the carbonaceous material in the aqueous solution, the promoter can be effectively permeated into pores of the carbonaceous material by reducing the pressure prevailing in a vessel containing the carbonaceous material and pouring the aqueous solution of the promoter into the vessel. Thus, a very distinguished result can be obtained by effecting said drying or heat-treatment of the resulting carbonaceous material thereafter.

Some of salts and oxides of said metal elements are volatilized by heating, and thus such material can be deposited on the carbonaceous material by heating.

The amount of the promoter to be supported on the carbonaceous material depends upon the specific promoter employed, but is usually in a range of 10 to 0.1% by weight, based on the carbonaceous material.

Even a small amount of chlorine, bromine or iodine is all effective, but a remarkable effect can be obtained when at least 0.01 g of chlorine, bromine or iodine is supported on 1 kg of the carbonaceous material.

The promoter supported on the carbonaceous material according to the present invention is not dependent upon the state of combination of the specific metal, and it is enough if said specific metal is only supported on the carbonaceous material. That is, it is presumed that, when the carbonaceous material impregnated with said specific metal element is brought in contact with a flue gas at a temperature of 100° to 150° C. or higher, almost all of these metal elements are converted to their oxides, but when the temperature is relatively low in treating the flue gas, some of them sometimes can remain in a state of salts, such as sulfate, etc.

However, even if the metal element is in a state of either oxide or salt, no difference is observed in effect as the promoter. Therefore, it is enough to impregnate the carbonaceous material with the promoter only by dissolving the metal element in water or solvent and permeate the resulting solution into the pores of the carbonaceous material. Thus, an aqueous solution of sulfate, chloride, nitrate or salt of organic acid thereof or a solution of the metal element in an acid can be used without any trouble.

The chlorine, bromine and iodine, or compounds capable of readily liberating them, for example, their ammonium salts, hydrogen compounds, etc., and said various metals can be used singly or in combination of a plurality thereof. That is, a good effect can be obtained by the activated carbon impregnated with ammonium iodide and vanadium pentoxide as well as by the activated carbon impregnated with ammonium iodide, ammonium bromide, vanadium pentoxide and copper oxide.

The most important feature of the present invention is in easy reduction of nitrogen oxides to nitrogen at such a low temperature as never conceivable in the conventional process for reducing the nitrogen oxides by ammonia injection. That is, as already described above, it is necessary in the conventional process to treat the flue gas at a high temperature in excess of 200° C. and usually 350° to 450° C. to reduce the nitrogen oxides to nitrogen by ammonia. The temperature of flue gas, which has been lowered e.g., to 150° C. to pass the flue gas through an electrostatic dust collector, must be elevated again. On the other hand, in the present invention, the nitrogen oxides can be reduced to nitrogen even at the room temperature, around 20° C. Thus, the flue gas at a low temperature, which has been passed through the electrostatic dust collector to remove suspended dusts, can be treated as such without heating the flue gas at all in the present invention. This is the important feature of the present invention, which has never been obtained in the conventional process.

Even in the present invention, rates of removing the nitrogen oxides and sulfur oxides are increased with increasing temperature of treating the flue gas, but the carbonaceous material such as activated carbon, etc. will burn at too high a temperature. Thus, the maximum temperature applicable to the present invention is about 200° C.

PREFERRED EMBODIMENTS OF THE INVENTION

The present invention will be described in detail below, referring to examples.

Example 1

Activated carbon for desulfurization purpose, prepared from coal as a raw material, was pulverized to 14 to 24 meshes, heat-treated at 400° C. for 2 hours in a nitrogen gas stream, then dipped in 5% aqueous solutions of various metal elements, and dried at 130° C. in the air, or heat-treated at about 400° C. in a nitrogen gas stream.

Then, the activated carbon was impregnated with 0.5 g of ammonium bromide per 10 ml of the activated carbon, and dried at 120° C. in the air.

Then, 17 ml of the activated carbon thus treated was filled in a reactor tube having an inner diameter of 15.5 mm, and a gas having such a composition as 1,000 ppm of NO, 10% of $H_2O$, 5% of $O_2$, and 1,000 ppm of $NH_3$, the balance being $N_2$, was passed through the reactor tube. An NO concentration at the outlet of the reactor tube was measured to determine percent removal of NO. Flow rate of the gas was 566 ml/min on the basis of 25° C., and reaction temperature was about 130° C.

As a result, the percent removal of NO was 89.0% in the case of using the activated carbon impregnated only with ammonium bromide, that is, the activated carbon free from the metal salt, whereas it was 99.5% in the case of using the activated carbon prepared by impregnation with vanadium pentoxide dissolved in nitric acid, drying at 130° C. and impregnation with ammonium bromide, 95.0% in the case of using the activated carbon prepared by impregnation with copper nitrate, heating at 400° C. and impregnation with ammonium bromide, 92.3% in the case of using the activated carbon prepared by impregnation with chromium nitrate, heating at 400° C. and impregnation with ammonium bromide, and 91.7% in the case of using the activated carbon prepared by impregnation with iron nitrate, heating at 400° C., and impregnation with ammonium bromide.

It was observed that all the activated carbons impregnated with the metal salt in addition to ammonium bromide could remove NO with very high percent removal at such a low temperature as 130° C.

However, in the case of using the activated carbon prepared by impregnation with manganese nitrate, heating at 400° C. and impregnation with ammonium bromide, percent removal of NO was only 80.0%, and it was observed in that case that the impregnation with the metal salt lowered the percent removal of NO to the contrary, and the presence of Mn interfered with the reduction reaction of NO.

In the present example, the amount of each metal salt supported as promoter on the activated carbon was about 50 mg as metal per one gram of the activated carbon.

Example 2

Activated carbon for ordinary gas treatment purpose, prepared from coal as a raw material, was pulverized to 14 to 24 meshes, and impregnated with various metal salts and ammonium bromide in the same manner as in Example 1, and percent removal of NO was determined under the same test conditions as in Example 1.

As a result, percent removal of NO was 94.0% in the case of using the activated carbon impregnated only with ammonium bromide, that is, the activated carbon free from the metal salt, whereas it was 99.9% in the case of using activated carbon impregnated with copper nitrate, heated at 400° C., and then impregnated with ammonium bromide, 99.8% in the case of using activated carbon prepared by impregnation of vanadium pentoxide dissolved in nitric acid, heating at 400° C., and impregnation with ammonium bromide, 98.1% in the case of using the activated carbon prepared by impregnation with chrominum nitrate, heat treatment at 400° C., and impregnation with ammonium bromide, and 98.9% in the case of using the activated carbon prepared by impregnation with nickel nitrate, drying at 130° C., and impregnation with ammonium bromide. In every cases, it was observed that NO could be removed with very high percent removal.

Example 3

The same activated carbon as used in Example 2 was impregnated with metal salts and ammonium bromide in the same manner as in Example 2, and percent removal of NO was determined. In the present example, the amount of the activated carbon to be filled in the reactor tube was reduced to one-third of that of Example 2. That is, a gas flow rate per unit volume of the activated carbon (SV) was 3 times as much as that of Example 2. After the impregnation with the metal salts, the activated carbons were all dried at 130° C.

As a result, the percent removal of NO was 69.6% in the case of using the activated carbon impregnated only with ammonium bromide, that is, the activated carbon free from the metal salt, whereas it was 99.7% in the case of using the activated carbon prepared by impregnation with vanadium pentoxide dissolved in nitric acid and impregnation with ammonium bromide, 88.3% in the case of using the activated carbon prepared with impregnation with copper nitrate and ammonium bromide, 86.6% in the case of using the activated carbon prepared by impregnation with copper acetate and ammonium bromide, 74.2% in the case of using the activated carbon prepared by impregnation with zirconium nitrate and ammonium bromide, 74.3% in the case of using the activated carbon prepared by impregnation with lanthanum nitrate and ammonium bromide, and 78.4% in the case of using the activated carbon prepared by impregnation with aluminum nitrate and ammonium bromide. In all cases, the effect of impregnation with the metal salts was observed.

On the other hand, the percent removals of NO were only 49.1% and 39.1% in the cases of using the activated carbons prepared by impregnation of manganese nitrate and zinc nitrate, respectively, in addition to the ammonium bromide, and in these cases no effect of impregnation with the metal salts was observed.

Example 4

The activated carbon of the same kind as used in Example 2 was impregnated with various metal salts and ammonium bromide in the same manner as in Example 2.

Then, 5.7 ml of the activated carbon thus treated was filled in the reactor tube shown in Example 1, and percent removal of NO was determined by passing a gas free from water at a flow rate of 566 ml/min. The gas had such a composition as 1,000 ppm of NO, 5% of $O_2$, and 1,000 ppm of $NH_3$, the balance being $N_2$.

As a result, the percent removal of NO was only 70% in the case of using the activated carbon impregnated only with ammonium bromide, that is, the activated carbon free from the metal salt, whereas it was 99.7% in the case of using the activated carbon impregnated with a solution of vanadium pentoxide dissolved in nitric acid, and ammonium bromide.

Similarly, the percent removals of NO were determined with the activated carbons impregnated with various metal salts dissolved in nitric acid, and ammonium bromide. It was 90.0% in the case of using the activated carbon impregnated with copper nitrate and ammonium bromide, 78.1% in the case of using the activated carbon impregnated with chromium nitrate and ammonium bromide, 96.2% in the case of using the activated carbon impregnated with ammonium molybdate and ammonium bromide, 73.6% in the case of using the activated carbon impregnated with ammonium tungstenate and ammonium bromide, 86.0% in the case of using the activated carbon impregnated with zirconium nitrate and ammonium bromide, 84.0% in the case of using the activated carbon impregnated with lanthanum nitrate and ammonium bromide, 78.8% in the case of using the activated carbon impregnated with cobalt nitrate and ammonium bromide, and 89.6% in the case of using the activated carbon impregnated with aluminum nitrate and ammonium bromide. In all cases, the effect of impregnation with the metal salts was observed.

On the other hand, the percent removals of NO were only 55.4% and 44.5% in the cases of using the activated carbons impregnated with manganese nitrate and zinc nitrate, respectively, in addition to ammonium bromide, and obviously no advantageous effect of impregnation with manganese or zinc was observed.

Example 5

The activated carbon of the same kind as used in Example 1 was pulverized to 14 to 24 meshes, and impregnated with metal salt and ammonium bromide in the same manner as in Example 1, but no heat treatment of the activated carbon was carried out in the present example.

Then, 5.7 ml of the activated carbon thus treated was filled in a reactor tube having an inner diameter of 15.5 mm, and the gas having the same composition as shown in Example 1 was passed therethrough at the same flow rate as in Example 1. The NO concentration at the outlet of the reactor tube was measured.

Said measurement was carried out by changing the temperature of the activated carbon in the reactor tube to various degrees to investigate influences of the reaction temperature upon the percent removal of NO.

Figure 3:
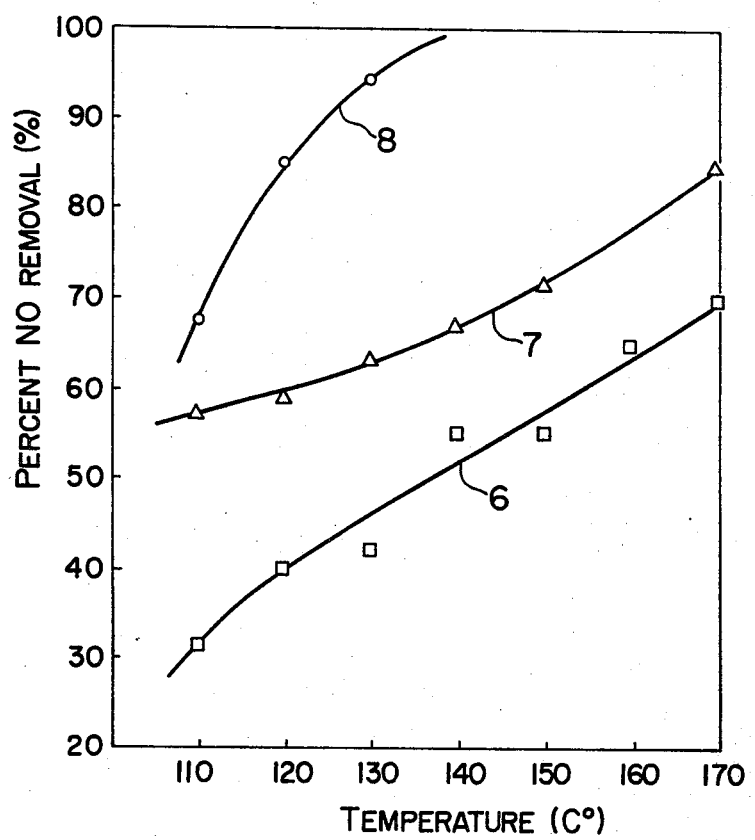
FIG. 3 is a graph showing relations between reaction temperature and percent removal when the nitrogen oxides are removed according to the present invention.

FIG. 3 is a graph showing relations between the reaction temperature and percent removal of NO thus obtained, where curve 6 shows the reaction in the case of using the activated carbon impregnated only with ammonium bromide, that is, the activated carbon free from any metal salt, curve 7 the reaction in the case of using the activated carbon impregnated with copper nitrate, heat-treated at 400° C. in a nitrogen gas stream, and impregnated with ammonium bromide, and curve 8 the relation in the case of using the activated carbon impregnated with vanadium pentoxide dissolved in nitric acid, heat-treated at 400° C. in a nitrogen gas stream, and impregnated with ammonium bromide.

As is apparent from FIG. 3, the percent removal of NO is increased in every cases with increasing reaction temperature, but the percent removal of NO is better at every temperatures in the cases of using the activated carbons impregnated with the metal salt than in the case of using the activated carbon free from the metal salt. Especially, a higher percent removal of NO is obtained in the case of using the activated carbon impregnated with vanadium pentoxide. Also in the case of using the activated carbon impregnated with ammonium metavanadate in place of vanadium pentoxide, heat-treated at 400° C. in a nitrogen gas stream, and impregnated with ammonium bromide, a result almost similar to that of curve 8 in FIG. 3 was obtained, and it was recognized that the presence of vanadium was very effective for the removal of NO.

Example 6

When a flue gas evolving from combustion of fuel oil in a power plant boiler is passed through an electrostatic dust collector, dusts contained in the flue gas are collected. The dusts contain vanadium, nickel, etc., and thus if the dusts contained in the boiler flue gas are used as raw materials for the promoter of the present invention, the present invention can be carried out at a very low cost.

50 g of dusts collected by an electrostatic dust collector from a flue gas evolved from combustion of fuel oil in a power plant boiler (the composition of dusts was 43.6% of water, 1.0% of $V_2O_5$, 0.32% of NiO, 0.02% of $K_2O$, 0.52% of $Na_2O$ and 49.3% of C) were heated at 700° C. in the air, and the resulting ashes were dissolved in 50 ml of hot 1.5 N dilute nitric acid. The solution was filtered, and 35 g of activated carbon (14 to 24 meshes) was dipped in the resulting filtrate, and dried at 130° C. in the air.

Then, the activated carbon was further impregnated with ammonium bromide (the amount of ammonium bromide thus impregnated was 10% by weight on the basis of the activated carbon), and dried at 120° C. in the air.

5.7 ml of the activated carbon impregnated with the promoter and ammonium bromide thus prepared was filled in a reactor tube having an inner diameter of 15.5 mm, and a gas containing 1,000 ppm of NO, 10% of $H_2O$, 5% of $O_2$ and 1,000 ppm of $NH_3$ was passed therethrough at 130° C. at a flow rate of 566 ml/min. (on the basis of 25° C.) to determine percent removal of NO.

As a result, the percent removal of NO thus obtained was about 99.5%.

On the other hand, in the case of using the activated carbon free from the nitric acid extract of the dusts, but impregnated only with ammonium bromide, the percent removal of NO was 69.6% under the same conditions as above, and it was recognized that the nitric acid extract of the dusts was effective for the removal of NO.

In the case of using the activated carbon impregnated with the nitric acid extract of dusts in the same manner as above, dried at 130° C., heat-treated at 400° C. in a nitrogen gas stream, and similarly impregnated with ammonium bromide, the percent removal of NO was about 98.7%, and the effect of nitric acid extract of dusts was also recognized in that case.

Petroleum sludges resulting from modification of light oil, etc. in their service or during their storage have been so far discarded, but they contain 10% or more of vanadium pentoxide, and thus can be used in the present invention in the same manner as in treating said flue gas dusts.

Example 7

Activated carbon was dipped in a nitric acid solution containing vanadium pentoxide and ferric nitrate in the dissolved state, and then heated at 400° C. in a nitrogen gas stream, and dried at 130° C. in air thereby depositing 0.5% by weight, each, of vanadium pentoxide and ferric oxide onto the activated carbon.

Then, the resulting activated carbon was impregnated with ammonium bromide in the same manner as in Example 1, and 2.4 ml of the activated carbon thus treated was filled in a reactor tube. A mixture gas having the same composition as in Example 4 was passed therethrough at a flow rate of 807 ml/min. (on the basis of 25° C.) to determine percent removal of NO. Rate of gas volume treated per unit volume of the activated carbon was 10 times the rate of Example 1, and the reaction temperature was 110° C.

In the case of using the activated carbon impregnated only with ammonium bromide, the percent removal of NO was 26%, whereas in the case of using the activated carbon impregnated with vanadium pentoxide and ferric oxide, and ammonium bromide, it was 89.2%.

Example 8

Activated carbon was dipped in a dilute nitric acid solution containing vanadium pentoxide in the dissolved state, and then heat-treated at 400° C. in a nitrogen gas stream, thereby depositing 1% by weight of vanadium pentoxide onto the activated carbon. Then, 10 ml of the resulting activated carbon was impregnated with 0.41 g of hydrogen bromide and dried at 120° C. in the air.

The activated carbon thus treated was contacted with the mixture gas under the same conditions as in Example 4 to determine percent removal of NO. The percent removal of NO was 99.7%, and the similar result was thus obtained in the case of using hydrogen bromide in place of ammonium bromide.

Example 9

Activated carbon was impregnated with 1% by weight of vanadium pentoxide, on the basis of the activated carbon, in the same manner as in Example 1, and further impregnated with 1% by weight of ammonium iodide, on the basis of the activated carbon, and dried at 120° C. in the air.

The activated carbon thus treated was subjected to NO removal of the mixture gas under the same conditions in Example 4 to determine percent removal of NO. The percent removal of NO was 78%.

On the other hand, in the case of using the activated carbon impregnated only with ammonium iodide but free from vanadium pentoxide, the percent removal of NO under the same conditions as above was only 20%. Remarkable effect of the presence of vanadium pentoxide was recognized.

Example 10

Activated carbon was impregnated with 1% by weight of vanadium pentoxide, on the basis of the activated carbon, in the same manner as in Example 1, and further impregnated with 10% by weight of bromine water and 1% by weight of ammonium iodide, on the basis of the activated carbon respectively, and dried at 120° C. in the air.

The activated carbon thus treated was subjected to NO removal in the same manner as in Example 4. The percent removal of NO was 90%, whereas in the case of using the activated carbon impregnated only with bromine water and ammonium iodide, the percent removal of NO was 55% under the same conditions as above.

As is apparent from the foregoing examples, the percent removal of nitrogen oxides is considerably increased by using an activated carbon prepared by depositing at least one of vanadium, copper, molybdenum, chromium, zirconium, lanthanum, nickel, iron, cobalt, aluminum and tungsten onto an activated carbon impregnated with ammonium bromide, other ammonium halides, hydrogen halides or simple halogen in removing nitrogen oxides in a flue gas by contacting the flue gas with the activated carbon in the presence of ammonia.

The metal elements applicable to the present invention are not limited only to the above-mentioned metals. That is, other metal elements belonging to the same groups of the above-mentioned metal elements in the periodic table can be used similarly. For example, copper is the element belonging to group 1B among the above-mentioned metals, and similar percent removal of NO to that by copper can be obtained by using silver or gold belonging to group 1B. That is, silver or gold can be used in the present invention, if it is disregarded that they are expensive.

Similarly, other elements of group 5B than said vanadium, for example, niobium or tantalum, can be used in the present invention.

In the present invention, the metal element can be readily deposited onto the activated carbon by dissolving the element in an appropriate acid or the like, and dipping the activated carbon in the resulting solution. The percent removal of nitrogen oxides is not influenced by the kind of acid to be used, and many salts, for example, nitrates, sulfates, and organic acid salts, can be used for the metal elements. By heat treatment after the deposition, or during continued treatment of the flue gas, most of these metal elements seem to be converted to their oxides. The oxides are also very effective for the removal of nitrogen oxides.

As already described above, the carbonaceous material must be impregnated only with at least one of said metal elements together with bromine or the like in the present invention, and the state of combination of the metal elements has no influence upon the effect of the present invention.

According to the present invention, the conventional ammonium halide process has been greatly improved to considerably enhance the rate of removing the nitrogen oxides, as described above. At the same time, the nitrogen oxides can be removed with a very high percent removal even at such a low temperature as the room temperature to about 200° C., which has not been conceivable at all in the conventional removal of nitrogen oxides by reduction through ammonia injection.

Consequently, the size of apparatus for denitration can be much reduced, as compared with the conventional apparatus, and also the flue gas at a low temperature, which has been subjected to dust removal in an electrostatic dust collector, can be treated as such in the present invention without reheating the flue gas. Thus, the industrial merits of the present invention are very great.

For convenience of description, only the case of NO has been explained as the nitrogen oxides in the foregoing description of the present invention, but a very small amount of $NO_2$ existing in boiler flue gas can be removed similarly in the present invention.

Sulfur oxides can be also removed in the present invention as rapidly as in the conventional ammonium halide process, and even the presence of sulfur oxides give no interference at all to the removal of nitrogen oxides. Even in any of the cases that there are both nitrogen oxides and sulfur oxides or there are either nitrogen oxides or sulfur oxides, they can be removed with higher percent removal. Halogens such as bromine, iodine, etc. can be deposited onto the carbonaceous material in advance, or can be injected together with the flue gas or ammonia. Of course, the same good result can be obtained also in the latter case.

In the foregoing description of the present invention, explanation has been made only of the so-called fixed bed type apparatus for treating the flue gas, in which the carbonaceous material is fixed in the reactor tube and used. However, sulfur oxides or nitrogen oxides can be also removed at the low temperature even in the so-called moving bed type apparatus for treating the flue gas, in which the flue gas is contacted with the carbonaceous material, while continuously moving the carbonaceous material through the reactor tube in a direction opposite to the flow direction of the flue gas, that is, countercurrent-wise. The present invention is also applicable to a moving bed type apparatus for treating the flue gas.

What is claimed is:

1. A process for removing at least one of nitrogen oxides and sulfur oxides contained in a flue gas, which comprises contacting a flue gas containing at least one of nitrogen oxides and sulfur oxides with a catalyst comprising a carbonaceous material impregnated with at least one of bromine, iodine, chlorine, ammonium bromide, ammonium iodide, ammonium chloride, hydrogen bromide, hydrogen iodide and hydrogen chloride, and at least one of metal elements of groups 1B, 3B, 4B, 5B, 6B, 2A, 3A and 8 of the periodic table as a promoter in the presence of ammonia.

2. A process according to claim 1, wherein the carbonaceous material is at least one of activated carbon, amorphous carbon, graphite, char coal and carbonized char.

3. A process according to claim 1, wherein the ammonia is supplied from an outside source.

4. A process according to claim 1, wherein the flue gas contains at least nitrogen oxides.

5. A process according to claim 1, wherein the flue gas contains at least nitrogen oxides and sulfur oxides.

6. A process according to claim 1, wherein at least 0.01 g of bromine, iodine or chlorine is impregnated per 1 kg of the carbonaceous material.

7. A process according to claim 1, wherein at least 0.01 g of the ammonium iodide, ammonium bromide, ammonium chloride, hydrogen bromide, hydrogen iodide or hydrogen chloride, in terms of bromine, iodine or chlorine, is impregnated per 1 kg of the carbonaceous material.

8. A process according to claim 1, wherein the promoter is vanadium pentoxide.

9. A process according to claim 1, wherein the promoter is in the form of oxide.

10. A process according to claim 1, wherein the promoter is in the form of sulfate.

11. A process according to claim 1, wherein the promoter is in the form of nitrate.

12. A process according to claim 1, wherein the promoter is in the form of chloride.

13. A process according to claim 1, wherein the promoter is in the form of organic acid salt.

14. A process according to claim 1, wherein 0.1 to 10% by weight of the promoter is impregnated on the basis of the carbonaceous material.

15. A process according to claim 1, wherein the flue gas is contacted with the carbonaceous material at a temperature of the room temperature to 200° C.

16. A process for removing nitrogen oxides from a gas mixture containing nitrogen oxides comprising simultaneously contacting said gas mixture with (1) ammonia and (2) a catalyst comprising a carbonaceous material impregnated with (a) at least one halogenous material selected from the group consisting of bromine, iodine, chlorine, ammonium bromide, ammonium iodide, ammonium chloride, hydrogen bromide, hydrogen iodide and hydrogen chloride and (b) at least one metal of groups 1B, 3B, 4B, 5B, 6B, 2A, 3A and 8 of the Periodic Table.

17. The process of claim 16, wherein said at least one metal is in the form of a salt when said carbonaceous material is impregnated with said at least one metal.

18. The process of claim 17, wherein said salt is selected from the group consisting of a sulphate salt, a nitrate salt, a chloride salt and an organic acid salt.

19. The process of claim 18, wherein said carbonaceous material is impregnated with 0.1 to 10% by weight of said at least one metal and at least 0.10 gm halogenous material measured as elemental halogen per kgm of said carbonaceous material.

20. The process of claim 16, wherein said gas mixture is contacted with said carbonaceous material at a temperature between room temperature and 200° C.

21. The Process of claim 20, wherein said carbonaceous material is activated carbon.

22. The process of claim 21, wherein said at least one metal is vanadium or copper.

23. The process of claim 22, wherein said carbonaceous material has thereon vanadium pentoxide or copper oxide.

24. The process of claim 21, wherein ammonia is mixed with said gas mixture prior to contact of said gas mixture with said carbonaceous material.

25. The process of claim 21, wherein said gas mixture and said ammonia gas are separately fed to said carbonaceous material.

26. A process according to claim 1, wherein the amount of ammonia present is stoichiometrically equivalent to or a little more than the total amount of said nitrogen oxides and sulfur oxides.

* * * * *